US009577796B2

(12) United States Patent
Ponnuswamy

(10) Patent No.: US 9,577,796 B2
(45) Date of Patent: Feb. 21, 2017

(54) MITIGATING INTERFERENCE IN WIRELESS SYSTEMS

(71) Applicant: Aruba Networks, Inc., Sunnyvale, CA (US)

(72) Inventor: Subburajan Ponnuswamy, Saratoga, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 335 days.

(21) Appl. No.: 14/164,059

(22) Filed: Jan. 24, 2014

(65) Prior Publication Data

US 2014/0348004 A1 Nov. 27, 2014

Related U.S. Application Data

(60) Provisional application No. 61/827,482, filed on May 24, 2013.

(51) Int. Cl.
*H04J 3/14* (2006.01)
*H04L 1/20* (2006.01)

(52) U.S. Cl.
CPC .................................. *H04L 1/203* (2013.01)

(58) Field of Classification Search
None
See application file for complete search history.

(56) References Cited

U.S. PATENT DOCUMENTS

| | | | | |
|---|---|---|---|---|
| 2010/0240317 | A1* | 9/2010 | Giles | H04B 17/29 455/67.13 |
| 2011/0188544 | A1* | 8/2011 | Ponnuswamy | H04B 1/713 375/136 |
| 2011/0243020 | A1* | 10/2011 | Ponnuswamy | H04L 41/22 370/252 |
| 2011/0249678 | A1* | 10/2011 | Bonicatto | H04L 1/0003 370/400 |
| 2011/0319088 | A1* | 12/2011 | Zhou | H04W 52/243 455/442 |
| 2013/0107772 | A1* | 5/2013 | Splitz | H04W 56/0015 370/311 |

* cited by examiner

*Primary Examiner* — Kwang B Yao
*Assistant Examiner* — Hardikkumar Patel
(74) *Attorney, Agent, or Firm* — Brooks, Cameron & Huebsch, PLLC

(57) ABSTRACT

According to one embodiment of the invention, a non-transitory computer readable medium for configuring a noise floor of a network device based on the detection of a non-Wi-Fi signal is described. One embodiment of the non-transitory computer readable medium comprises instructions that detect a non-Wi-Fi signal, determine a noise floor based on at least one attribute of the non-Wi-Fi signal and configure the noise floor of the network device such that the network device receives signals with a signal strength above the noise floor value.

20 Claims, 5 Drawing Sheets

MITIGATING INTERFERENCE IN WIRELESS SYSTEMS

CROSS-REFERENCE TO RELATED APPLICATIONS

This application claims the benefit of priority on U.S. Provisional Application No. 61/827,482 filed May 24, 2013, the contents of which are incorporated by reference.

TECHNICAL FIELD

Embodiments of the present disclosure relates to detecting in-band or out-of-band interference. One embodiment of the present disclosure further relates to taking corrective actions to, for example, improve throughput, improve reliability, and minimize the packet error rate in the presence of interference.

GENERAL BACKGROUND

In recent years, Wireless Local Area Network (WLAN) technologies have emerged as a fast-growing market. Among the various WLAN technologies, Institute of Electrical and Electronics Engineers (IEEE) 802.11 standard is the dominating technology and is frequently used for WLANs.

Devices within WLANs communicate wirelessly pursuant to the 802.11 standard with other devices within the WLAN to request, grant, provide, and/or receive access to network resources. However, wireless communication between a first set of devices may interfere with communication between another set of devices. In one example, a first set of devices communicating on a particular channel may cause interference for a second set of devices communicating on the same channel (or partially overlapping channels) if wireless signals, transmitted between devices in the first set of devices, reaches devices in the second set of devices.

Interference that affects wireless communication can come in many forms from sources operating in-band or out-of-band. There are different types of in-band and out-of band interference that may or may not be directly measurable at a narrow-band receiver. Interference may affect the ability of the network device to transmit and/or receive. In general, the receiver will be the most affected by out-of-band interference. Since transmit and receive paths are closely tied in Institute of Electrical and Electronics Engineers (IEEE) 802.11 standards (e.g., every directed frame sequence transmission requires the reception of an ACK or Block ACK), it may be difficult to pinpoint the problem in some cases. The Transmit (Tx) will be affected in different ways depending whether or not the in-band interference can be measured by the network device. For example, in IEEE 802.11 standards, when the measured in-band interference strength exceeds the Energy Detect Threshold (EDT), the ability of the network device to transmit will be affected. If the in-band interference is not directly measurable, then the transmissions may be corrupted.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present disclosure may be best understood by referring to the following description and accompanying drawings that are used to illustrate embodiments of the present disclosure.

DETAILED DESCRIPTION

Figure 1:
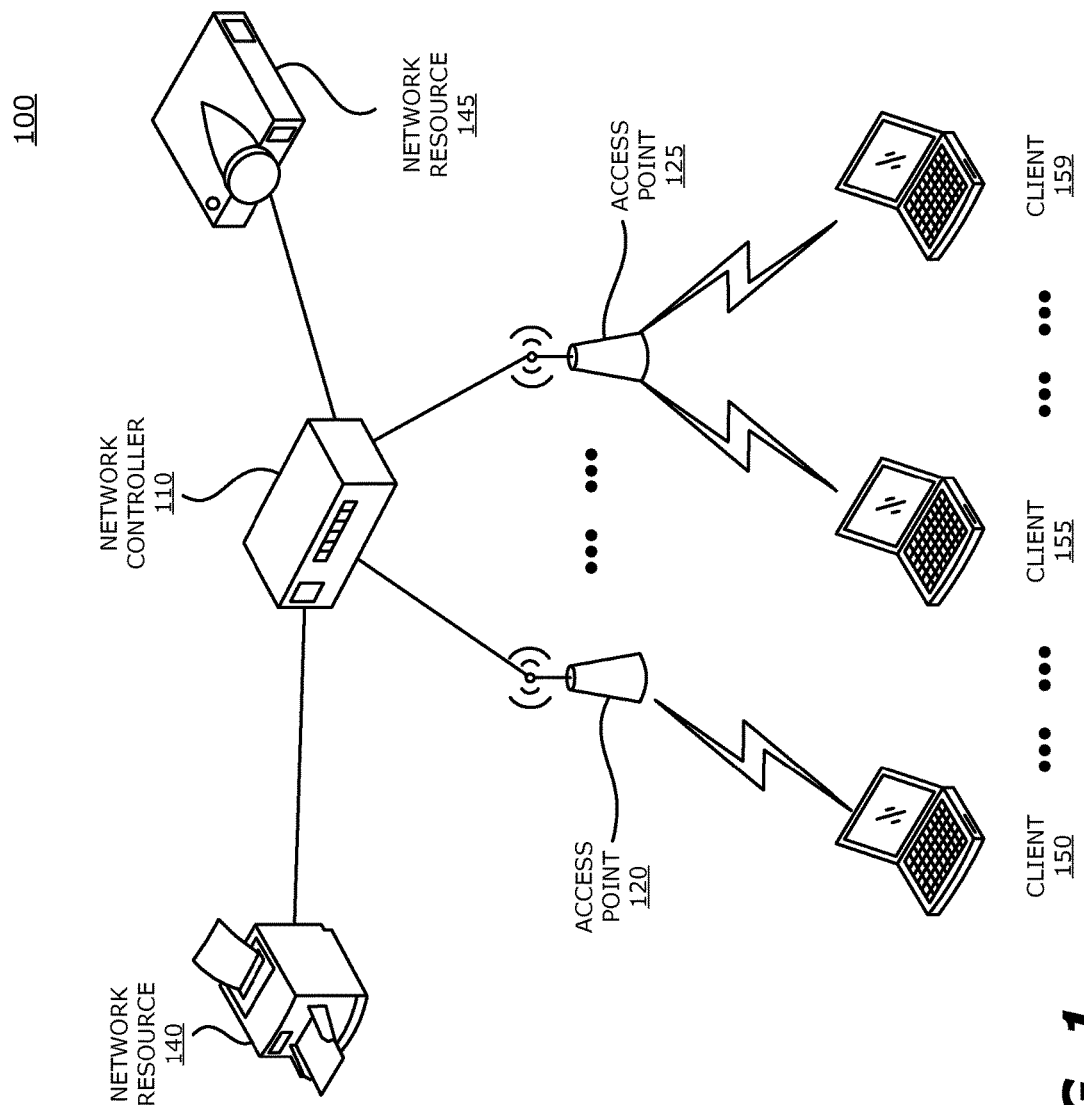
FIG. 1 illustrates an exemplary network computing environment according to embodiments of the present disclosure.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention. The detailed description includes the following sections:

1. GENERAL OVERVIEW
2. DETECTING THE TYPE AND/OR SOURCE OF INTERFERENCE
3. TAKING CORRECTIVE ACTION
4. EXAMPLE EMBODIMENTS

Herein, certain terminology is used to describe features within embodiments described in the disclosure. For example, the term "network device" generally refers to an electronic device that is configured to enable transmission and/or receipt of messages over a network. For instance, the network device may be adapted with circuitry to support wireless connectivity with other network devices being part of a wireless network. Different types of network devices may include, but are not limited to (1) a network controller, (2) client device or (3) an access point, described below.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "link" is a physical or logical communication path between two or more network devices. Examples of a link may include a wireless link that supports the transfer of wireless messages over certain radio frequency (RF) channels and/or bands or cellular frequency channels and/or bands, as well as the logic associated therewith.

The term "message" generally refers to information transmitted as information in a prescribed format, where each message may be in the form of a packet, a frame, an IEEE 802.11 frame, or any other series of bits having the prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

1. General Overview

Embodiments relate to one or more of: detecting a type of wireless communication interference, detecting a source of wireless communication interference, estimating a level and/or probability of wireless communication interference, and taking corrective actions to mitigate wireless communication interference. Corrective actions may be taken with appropriate threshold values based on detected levels or probabilities of interference.

2. Detecting the Type and/or Source of Interference

FIG. 1 illustrates a network computing environment 100 according to embodiments of the present disclosure. The network computing environment comprises a plurality of network devices. According to one embodiment of the disclosure, the plurality of network devices include a network controller 110; one or more network resources, such as network resource 140 (network printer) and network resource 145 (network projector) for example; one or more access points such as access point 120 and access point 125; and one or more client devices such as client 150, client 155, . . . , client 159, etc.

As shown, network controller 110 is a hardware device and/or software module that provides network management, which include but are not limited to, controlling, planning, allocating, deploying, coordinating, and/or monitoring the resources of a network, network planning, frequency allocation, predetermined traffic routing to support load balancing, cryptographic key distribution authorization, configuration management, fault management, security management, performance management, bandwidth management, route analytics and accounting management, etc.

Furthermore, the network controller 110 can be connected to a router (not shown) through zero or more hops in a layer 3 or layer 2 network. The router can forward traffic to and receive traffic from the Internet. The router generally is a network device that forwards data packets between different networks, and thus creating an overlay internetwork. A router is typically connected to two or more data lines from different networks. When a data packet comes in one of the data lines, the router reads the address information in the packet to determine its destination. Then, using information in its routing table or routing policy, the router directs the packet to the next/different network. A data packet is typically forwarded from one router to another router through the Internet until the packet gets to its destination.

Moreover, assuming that a number of access points, such as access point 120, access point 125, etc., are interconnected with network device 100. Each access point 120 or 125 may be interconnected with zero or more client devices via either a wired interface or a wireless interface. In this example, for illustration purposes only, assuming that the client 150 is associated with the access point 120 via a wireless link. An access point 120 or 125 generally refers to a network device that allows wireless clients to connect to a wired network. Access points 120 or 125 may be communicatively coupled to network controller 110 via a wired network (e.g., via optional layer 2 or layer 3 network) or may be implemented in a controller-less based deployment where functionality handled by network controller 110 is now handled by the access point(s) 120 and/or 125. Although the disclosure describes the access point(s) 120 and/or 125 support Wi-Fi connectivity, it is contemplated that access point(s) 120 and/or 125 may be a wireless base station, a cellular base station, or any device configured as a hot spot or gateway for network connectivity.

A client device, such as client 150, client 155, . . . , or client 159, may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network.

Although only a few clients are illustrated in FIG. 1, a plurality of clients can be included in network computing environment 100.

In a typical deployment scenario, multiple objects often create interference which impacts the wireless transmission of data. When devices operate in close proximity, both in terms of physical location and radio frequencies, opportunities for interference arise. Such interference can occur not only when devices operate on the same channel, but when devices operate on partially overlapping or adjacent channels. Thus, it is important to mitigate the various interferences in order to maintain the reliability of transmissions.

Figure 2:
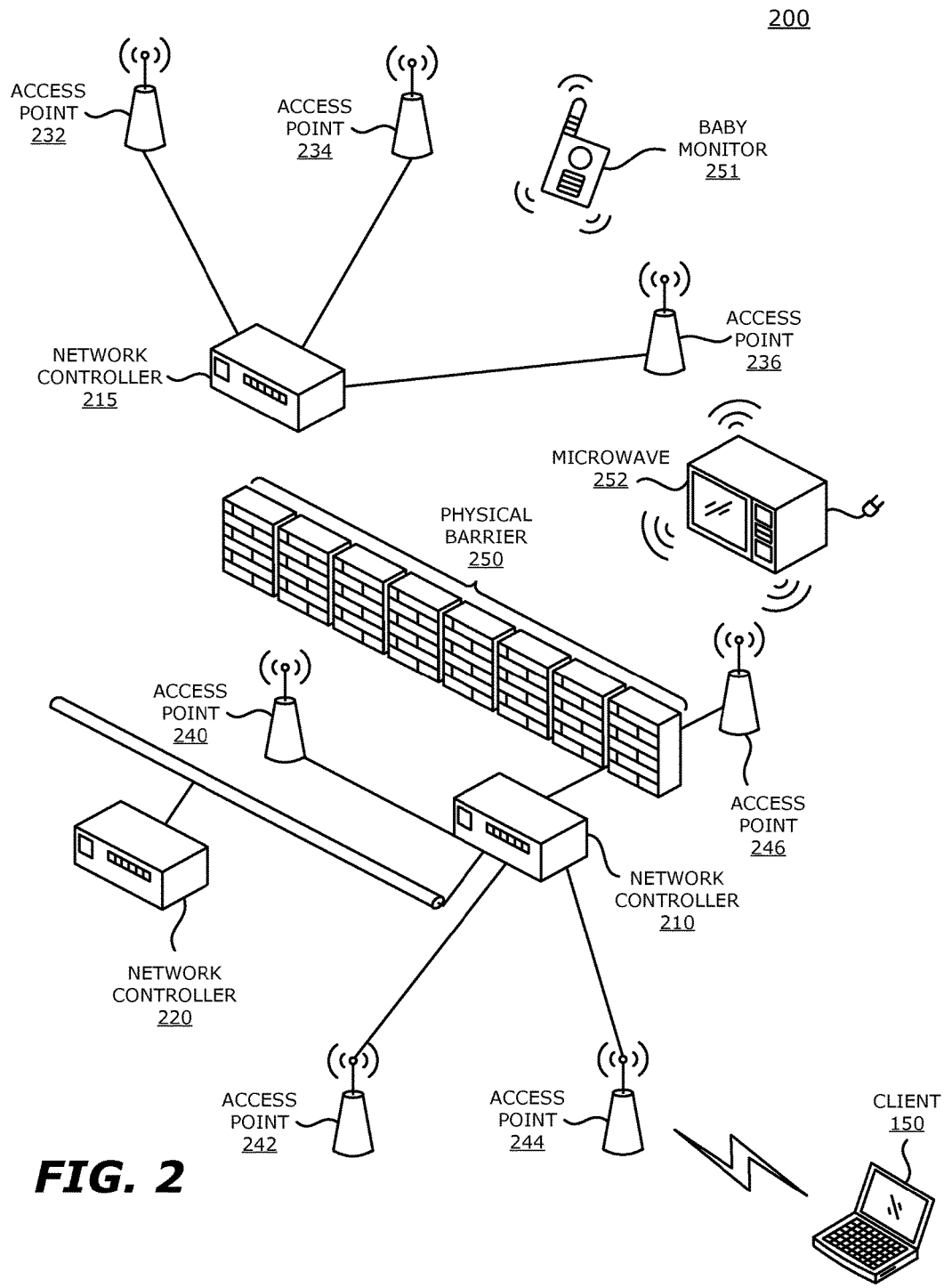
FIG. 2 illustrates a second exemplary network computing environment according to embodiments of the present disclosure.

FIG. 2 shows another exemplary network computing environment 200 according to embodiments of the present disclosure. The network computing environment illustrated in FIG. 2 includes network controller 220, which is connected via wired network connections to a number of other network devices, such as network controller 210 and network controller 215. Moreover, these network devices may be organized in hierarchical levels. For example, network controller 220 may be configured as a master controller that communicates with a number of lower level controllers, such as network controller 210 and network controller 215.

Furthermore, each network device may be connected to a number of other wireless network devices, such as access points, network routers, etc. In this example, network controller 210 is connected to access point 240, access point 242, access point 244, and access point 246; and, network device 215 is further connected to access point 232, access point 234, and access point 236. In addition, a physical barrier 250 serves as a potential source of interference as it is capable of partially or fully blocking wireless signals. Because of the existence of physical barrier 250, wireless communications between certain network devices in the wireless network may drop below a desired minimum signal level. Baby monitor 251 is a second interference source present in the network computing environment 200. Microwave 252 is a third interference source present in the network computing environment 200. Baby monitor 251 and microwave 252 may each emit wireless signals when placed in the active state that potentially interfere with transmissions between, for example, access point 244 and client 150. Other sources of interference may include any wireless signal emitting device that intermittently is placed in an active state such as a cordless telephone, Xbox®, or the like.

In an embodiment, a type of interference detected is based on one or more metrics, or error rates, consisting of: (a) Measured Noise Floor, (b) difference in measured Signal-To-Noise Ratio (SNR) and the actual SNR as estimated based on the sustained Modulation and Coding Schemes (MCS), (c) difference between the expected Receive (Rx) rate (based on the SNR) and the actual Rx rate, (d) signal strength, center frequency and duty cycle as measured from spectral data of Fast Fourier Transforms (FFTs), (e) packet error rate (e.g. cyclic redundancy check "CRC" errors), (f) retry rate, (g) physical (PHY) layer errors, (h) information provided by network device, or (i) Interference Duty Cycle estimated from Channel Utilization.

The measured noise floor is defined as a measure, normally as a value in dBm, of the signal created from the sum of all of the noise sources and unwanted signals that are persistently detected within a network computing environment. In one embodiment, "noise" is defined as any signal other than the signal being transmitted or monitored. Interference to a transmission may be reflected as noise if the interference has a high duty cycle, normally ranging between 90-100%. The duty cycle may be defined as the percentage of time that the device spends in an active state.

A non-Wi-Fi signal that acts as interference to a network device may not have a high duty cycle near 90-100%. In this situation, the non-Wi-Fi signal may be from a source that is not active continuously but may operate periodically or hop in and out of various frequencies in a pseudo-random sequence. For the W-Fi devices operating on a specific channel, these sources may appear as on and off for specific durations. Such an interfering device may be called an on/off source. Examples of an on/off source include, but are not limited or restricted to, a microwave, an Xbox®, a Bluetooth® device, or a baby monitor.

The difference in measured Signal-to-Noise Ratio (SNR) and the actual SNR as estimated based on the sustained Modulation and Coding Schemes (MCS) may be used to infer the presence of interference on the channel. In order to maintain a specific MCS, a particular minimum SNR is needed. This particular SNR is referred to as the actual SNR. The measured SNR is the SNR value measured by the radio when a frame is received. In one illustrative example, a measured SNR of 30 dBm may be expected to support a MCS of 52 megabits per second (Mbps). If the actual SNR (based on the sustained MCS) as seen by the network device is 20 dBm, the network device may infer the presence of interference on the channel due to the difference in the measured SNR and the actual SNR. The difference in the measured SNR and the actual SNR may allow an inference of interference on the channel but may alternatively mean that the channel cannot support the specific data rate due to the location of the network device.

The difference between the expected Rx rate (based on the SNR) and the actual Rx rate is similar to the difference in measured SNR and the actual SNR as estimated based on the sustained MCS in the sense that the network device requires a particular SNR is to support a specific MCS. However, instead of inferring the potential presence of interference on the channel based on the difference between the measured SNR and the actual SNR, a network device may look at the expected Rx rate and the actual Rx rate. The expected Rx rate is the rate at which the network device expects to receive data based on the measured SNR. The actual Rx rate is the rate at which the network device is receiving data. An inference of potential interference on the channel may be made from the difference between the expected Rx rate and the actual Rx rate. For example, if the network device expects a Rx rate of 52 Mbps but is only receiving data at a rate of 30 Mbps, the network device may infer that there is interference on the channel due to the difference in the expected Rx rate and the actual Rx rate.

In one embodiment, measurements from the spectral data of Fast Fourier Transforms (FFTs) may also be used to detect a possibility of interference. For example, the signal strength, center frequency and duty cycle as measured from spectral data of FFTs may be utilized. It is possible to detect the presence of interference by observing patterns in the spectrum analysis. In one embodiment, the FFT amplitude (signal strength) of the observed energy on the channel or on adjacent channels may allow for an inference of interference. For instance, if a frequency hopper has a high signal strength as observed by the radio, e.g., −31 dBm, most Wi-Fi transmissions likely will be below this threshold and therefore the hopper will overpower the Wi-Fi transmissions. A frequency hopper may be defined as a device having the ability to transmit signals across a plurality of radio frequencies and the device hops among multiple radio frequency channels on which it transmits. Therefore, based on the signal strength of the hopper estimated from the FFT, the network device may infer interference on the channel. In another embodiment, the center of frequency of the FFT samples may allow for an inference of interference. The frequency in which a source causing interference operates is typically referred to as its center frequency. So the center frequency of the source causing interference derived from the FFT samples indicates whether the interfering source conflicts with the operating channel of the wireless network device. From this, it is possible to determine whether the energy of the interfering device is affecting the transmission of and/or reception by the wireless network device. In yet another embodiment, the duty cycle calculated from FFT samples may indicate the level of interference. For example, the duty cycle may indicate that the interference is on 40% of the time or, alternatively, only 5%. It should be noted that some percentage of interference may be acceptable in certain environments.

The packet error rate, e.g., CRC error rate, is the rate of errors calculated by comparing the packets successfully transmitted or received with the packets unsuccessfully transmitted or received. Errors may be due to collisions or hidden nodes but high rates of CRC errors may indicate the presence of interference. In one illustrative example, interference may be present near a receiver but it is not detectable by the network device; however, a very high CRC error rate will allow the network device to infer that there may be interference near the receiver. In another example, if an acceptable packet error rate is 10% but the current packet error rate is measured at 80%, the network device may infer that there is interference. The noise floor may then be artificially increased by, for example, 2 or 3 dB. The packet error rate will then be measured with the increased noise floor in order to determine whether the increased noise floor resulted in an improvement in the packet error rate. The noise floor may then be adjusted again depending on the measurement of the packet error rate after the initial increase in the noise floor. In this example, the measuring of the packet error rate after adjusting the noise floor is done because the packet error rate is the measurement that triggered the inference that interference may be present.

The retry rate is the rate at which the network device attempts to retransmit data to one or more receivers. Similarly to the packet error rate, a high retry rate allows for the inference that there is interference present.

A physical (PHY) layer error occurs when a network device reports an error due to the detection of a signal that was a non-Wi-Fi signal. PHY layer errors may be used to detect the presence of interference by assessing the number of PHY layer errors reported. For instance, a network device may try to receive a signal for a short time period, e.g., a few microseconds, whenever the network device senses a signal in order to determine whether the signal is Wi-Fi. The network device does this because it cannot determine whether the signal is Wi-Fi until some portion of the signal is received. The network device will then report an error if the network device determines the signal is not Wi-Fi. When there is a large number of PHY layer errors, it can be inferred there is interference present.

Information provided by network devices is any additional information stating that there is something on the channel other than the signal being transmitted or received.

The interference duty cycle estimated from channel utilization may permit an inference of interference on the channel. The duty cycle used may be that of the spectral data of the FFTs as discussed above. If the network device senses energy on the channel (e.g., the energy is above some threshold), the network device will report this as non-Wi-Fi channel utilization and will not transmit. If the duty cycle of the estimated channel utilization is high, the inference that interference is present may be made.

Analyzing the rate of beacon failures is yet another way to detect the presence of interference. In a typical Wi-Fi deployment, a beacon frame is transmitted periodically by a network device. The network device may infer that there is constant energy on the channel (e.g., interference) if the transmission of the beacon frame repeatedly fails.

When one metric allows for an inference of interference, the noise floor on the network device detecting the interference may be configured for a value higher than the measured noise floor. In such an embodiment, the purpose of the artificially elevated noise floor is to cause the network device to ignore signals below the noise floor, therefore increasing the likelihood of a successful reception. For example, if the network device infers interference on the operating channel due to a high retry rate, the network device may be reconfigured using an elevated noise floor value. In another embodiment, the elevated noise floor used to reconfigure the network device may be based in part on the amplitude of a FFT of the detected non-Wi-Fi signal.

When more than one metric allows for an inference of interference, adjustments will be made to both metrics in order to find a common scenario that provides acceptable performance for both metrics. If no common scenario can be found for the plurality of metrics such that all have acceptable performance levels, the data transmission rate may be reduced or stopped. In some embodiments, an upper-bound on how high the noise floor will be artificially set as it will be unlikely that the network device will receive any transmissions above a certain noise level. For example, an upper-bound for the noise floor may be set at −70 dBm with typical minimum transmission levels around −90 dBm.

Figure 3:
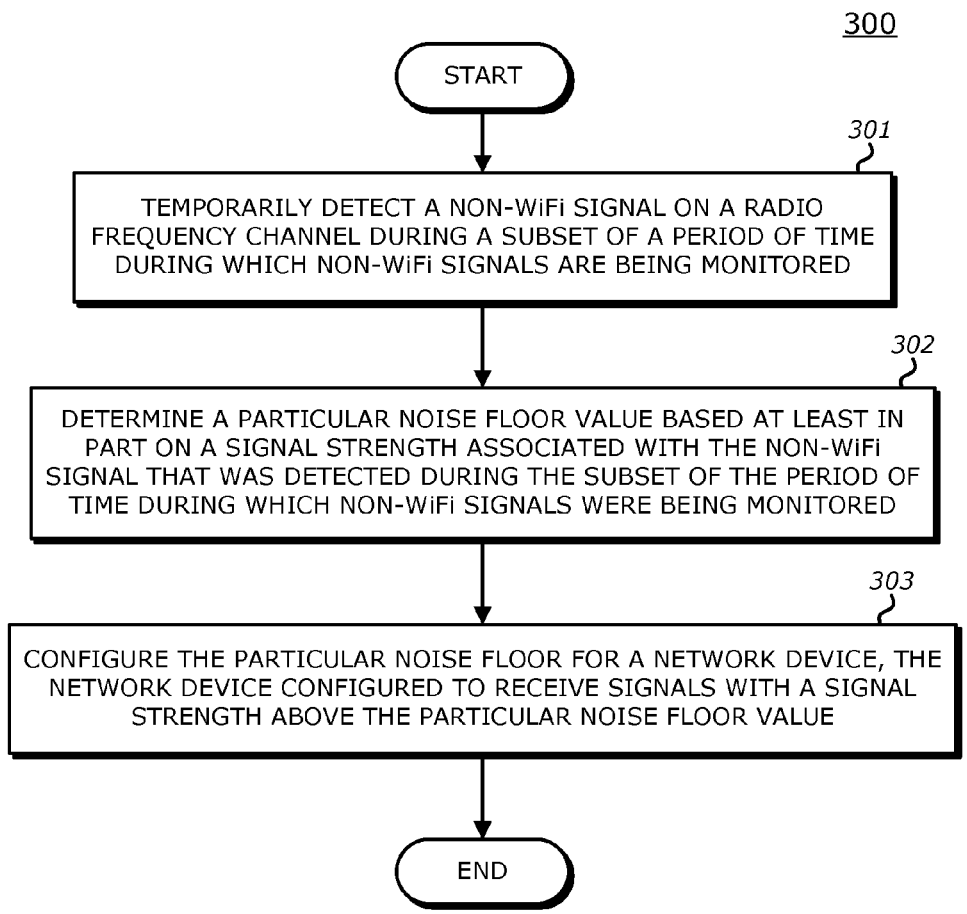
FIG. 3 is a flow chart of illustrative operations of one embodiment of a process for artificially configuring the noise floor of a network device.

Referring to FIG. 3, a flow chart of illustrative operations of one embodiment of a process for artificially configuring the noise floor of a network device is depicted. In block 301, a network device temporarily detects a non-Wi-Fi signal on a radio frequency channel during a subset of a period of time during which non-Wi-Fi signals are being monitored. In block 302, the network device determines a particular noise floor value based at least in part on a signal strength associated with the non-Wi-Fi signal that was detected during the subset of the period of time during which non-Wi-Fi signals were being monitored. In block 303, the network device configures its particular noise floor, the network device now being configured to receive signals with a signal strength above the particular noise floor value.

Figure 4:
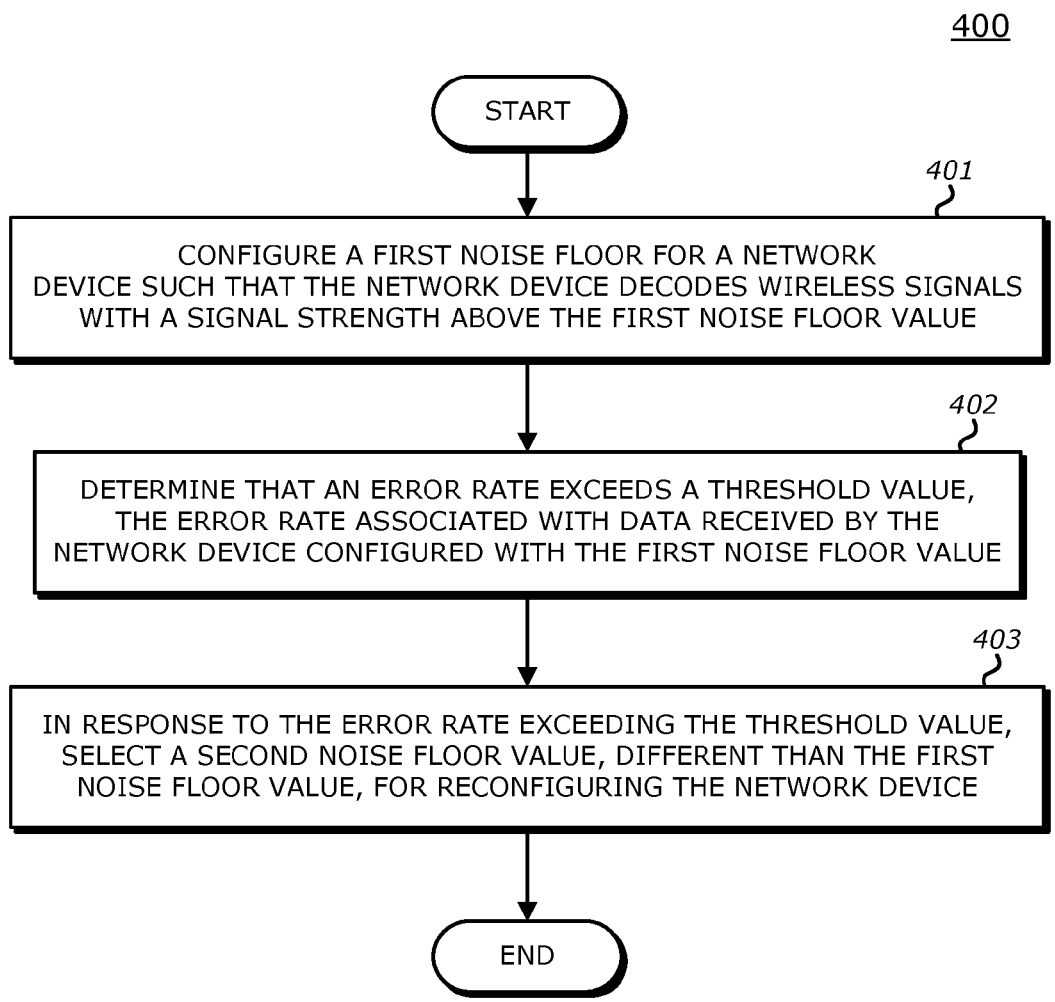
FIG. 4 is a flow chart of illustrative operations of a second embodiment of a process for artificially configuring the noise floor of a network device.

Referring to FIG. 4, a flow chart of illustrative operations of a second embodiment of a process for artificially configuring the noise floor of a network device is depicted. In block 401, a network device configures a first noise floor for the network device such that the network device decodes wireless signals with a signal strength above the first noise floor value. In block 402, the network device determines that an error rate exceeds a threshold value where the error rate is associated with data received by the network device configured with the first noise floor. In block 403, in response to the error rate exceeding the threshold value, the network device selects a second noise floor value that is different than the first noise floor value. The noise floor of the network device is reconfigured with the second noise floor value.

Figure 5:
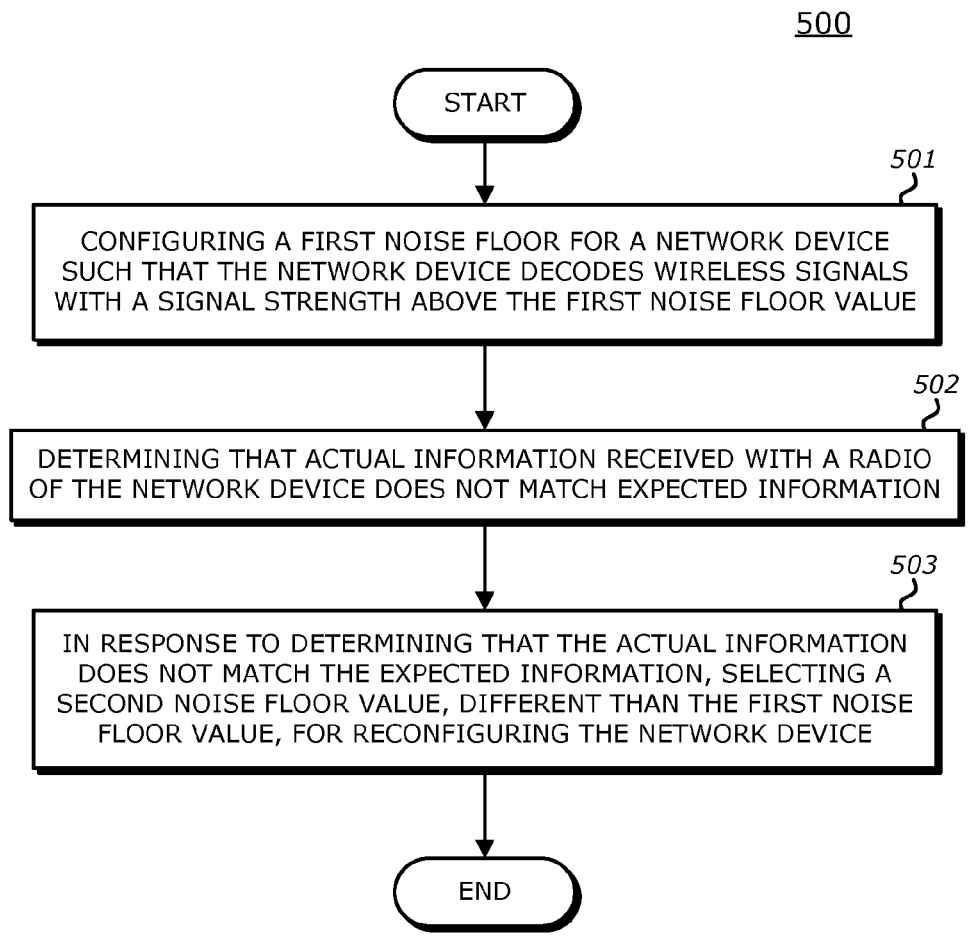
FIG. 5 is a flow chart of illustrative operations of a third embodiment of a process for artificially configuring the noise floor of a network device.

Referring to FIG. 5, a flow chart of illustrative operations of a third embodiment of a process for artificially configuring the noise floor of a network device is depicted. In block 501, a network device configures a first noise floor for the network device such that the network device decodes wireless signals with a signal strength above a first noise floor value. In block 502, the network device determines that actual information received with the radio of the network device does not match expected information. In block 503, in response to determining that the actual information does not match the expected information, the network device selects a second noise floor value, different than the first noise floor value, for reconfiguring the noise floor of the network device.

In one embodiment, the types of interference include one or more of: (1) in-band from internal sources (for example board noise), (2) in-band constant wave interference from external sources, (3) in-band interference from other devices operating on the same channel with less than 100% duty cycle, (4) out-of-band interference resulting in received blocking or desensitization, (5) out-of-band interference resulting in increased noise floor, (6) out-of-band interference resulting in harmonic distortion, or (7) out-of-band interference resulting in Inter-Modulation Distortion (IMD).

In-band interference from internal sources (e.g., noise from the circuit board) is interference internal to a network device. The internal interference could be coming from the CPU, internal memory, graphics card, or any component on the circuit board which can potentially affect the transmission. In some instances, this may be difficult to detect as the interference may only occur under certain conditions. For example, interference may only arise when a packet of a certain size is transmitted and/or received.

In-band constant wave interference from external sources is interference that comes from external sources and has a duty cycle of or near 100%. This type of interference also remains on one frequency. Examples of in-band constant wave interference from external sources include, but are not limited or restricted to, video or audio transmitters such as wireless video monitoring devices, television (TV) devices that transmit a television signal from a first TV to a second TV.

In-band interference from other devices operating on the same channel with less than 100% duty cycle includes, but is not limited or restricted to, energy from a microwave, Bluetooth®, Xbox or motion detectors. This type of interference operates on a specific channel but typically does not have a duty cycle near 100%.

Out-of-band interference resulting in receiver blocking or desensitization is interference that is present on a frequency very near the operating frequency of the network device (e.g., the network device is operating on 2.4 GHz and the interference is operating on 2.39 GHz) and is not properly filtered out by the network device. The interference may desensitize the network device therefore preventing the network device from supporting the MCS for a given SNR.

Out-of-band interference resulting in an increased noise floor is typically the same interference as out-of-band interference resulting in received blocking or desensitization discussed above. In addition to possibly desensitizing the network device, this type of interference may also increase the noise floor.

Out-of-band interference resulting in harmonic distortion arises when the source causing the interference is operating on a frequency not close in proximity to the frequency on which the network device is operating, the operating frequency of the network device is a multiple of the operating frequency of the source causing the interference, the interference has a high signal strength and is above a saturation point of the receiver components (such as the Low Noise Amplifier and Baseband). In this situation, the interference may leak into the operating channel of the network device because the operating frequency of the network device is a multiple of the operating frequency of the source causing the interference causing harmonic distortion. For example, if the network device is operating at 5 GHz and the source causing the interference is operating on 2.5 GHz, if the signal strength of the interference is high, it may leak into the operating channel of the network device.

Out-of-band interference resulting in inter-modulation distortion (IMD) is similar to out-of-band interference resulting in harmonic distortion but where harmonic distortion requires only one source of interference, inter-modulation distortion requires at least two sources of interference. Inter-modulation distortion affects transmission or reception of data in the same manner as harmonic distortion; however, the two or more sources of interference combine in waves which cause a distortion at the combined frequency. As an illustrative example, if a first source of interference is at frequency F1, e.g., 800 MHz, a second source of interference is at frequency F2, e.g., 900 MHz, and the operating frequency of the network device is 2.5 GHz, inter-modulation distortion occurs when the sources of interference combine to also operate at 2.5 GHz. This may happen when the signal strength at F1 is high and its energy combined with F2 may be detected at twice its operating frequency, or 1.6 GHz plus F2 (900 MHz), which equals 2.5 GHz (e.g., 2F1+F2). In that case, the combination of the interferences at F1 and F2 operates at 2.5 GHz which may affect the transmission of and/or reception by the network device.

3. Taking Corrective Action

Embodiments relate to taking one or more corrective actions after interference is detected. In one embodiment, a corrective action includes artificially programming (e.g., configuring) a higher noise floor at a network device by overriding the network device's internal noise floor calibration. In an example, a wireless signal must be received with a minimum Signal-to-Noise Ratio (SNR) to receive the corresponding frame (e.g., 54 Mbps Orthogonal Frequency Division Multiplexing (OFDM) frame requires at least 25 dB of SNR). In order to correctly determine the SNR, the signal and the noise must be measured accurately (within an acceptable error range). If the measurement or calibration of the noise is inaccurate, a receiving device may compute an inaccurate SNR which does not meet the required minimum SNR. In order to ensure that the minimum SNR is met, the noise may be configured (instead of measured by the network device) at a higher level for use in computing the SNR of received signals. The higher noise configuration results in requiring a higher received signal strength of received signals which corresponds to a higher accuracy and fewer errors. Furthermore, transmitting devices will automatically increase their transmit power such that transmitted signals will reach the receiving devices at a SNR that meets the minimum SNR and is computed based on the configured noise. Embodiments include configuring the noise (e.g., artificially selecting the noise instead of measuring the noise) via software programming, hardware configuration, or a combination thereof.

In an embodiment, configuring the noise is performed by incrementally increasing the noise until an acceptable performance by the network device is obtained. For example, an increase in noise may be triggered by detection of interference, detection of a threshold packet error rate, or any other type of error as described above. After incrementally increasing the noise, the newly configured level of noise may then be tested to determine if a performance measurement is acceptable (e.g., packet retry rate below a certain threshold). Once a particular value for noise corresponding to acceptable performance is identified, the particular value is used either for a temporary or permanent basis.

In an example, a measured level of noise being used for SNR computations is found to be ineffective on the basis that performance is not acceptable (e.g., a packet error rate is above a particular threshold). In response, the value of the artificially configured noise level is incrementally increased and tested until the packet error rate is determined to be below the particular threshold. In an example, a maximum noise value (e.g., −62 dBm) may be used to limit the incrementing of the level of noise. This increased value of noise results in temporarily increasing the minimum received signal strength for received wireless signals.

After a period of time, the interference which caused the ineffectiveness of the measured level of noise being used for SNR computations may have ceased. In order to test if the interference has ceased and/or to determine if a lower value of noise will result in acceptable performance, lower values of noise are tested. The measured value of noise may be tested or a step function may be used to decrease the value of the level of noise. In one illustrative example, the value for noise is decreased by 2 dB and a transmission is tested to determine if performance is acceptable at the new corresponding SNR computed for received signals. If acceptable, the value for noise is again decreased and tested. The process is repeated until the value for noise reaches an unacceptable performance level. In this case, the value of noise is increased to the lowest value of noise where performance was determined to be acceptable. In one embodiment, a binary search tactic may be applied in order to determine what value of noise will result in acceptable performance.

In another example, a corrective action includes reducing the Wi-Fi receiving sensitivity. Reducing Wi-Fi receiving sensitivity reduces the amount of Wi-Fi traffic received by the network device and indirectly mitigates the effects of interference.

4. Example Embodiments

In an example, interference is detected based on a network device's inability to measure and/or calibrate noise accurately. A determination of a network device's inability to measure and/or calibrate noise accurately is based on a comparison between a measured Signal-to-Noise Ratio (SNR) of received frames and a minimum SNR required to sustain the Modulation and Coding Schemes (MCS) of received frames. If a difference between the measured SNR and the minimum SNR required to sustain the MCS of received frames is above a particular threshold, then it is determined that the network device is not able to estimate its SNR to an acceptable accuracy.

In an example, interference is detected based on a difference between (i) a Frame Error Rate that should be sustained based on the SNR of received frames and (ii) an actual Frame Error Rate. A difference greater than a particular threshold indicates that interference is causing frames to be dropped.

In an embodiment, a probability of interference is determined based on a combination of multiple factors described herein. In one example, a probability of interference is determined based on the occurrence or non-occurrence of one or more of the following events for a particular period of time:
(A) A difference between the measured SNR and the minimum SNR required to sustain the MCS of received frames is above a particular threshold;
(B) A difference between (i) a Frame Error Rate that should be sustained based on a SNR of received frames and (ii) an actual Frame Error Rate that is greater than a particular threshold; or
(C) A difference between a reported noise floor and a nominal or expected noise floor is larger than a particular threshold.

In an example, occurrence of one of events (A) or (B), above, indicates a probability of x percent (e.g., 35%) of interference. In another example, occurrence of events (A) and (B) indicates a probability of y percent (e.g., 65%) of interference. In another example, occurrence of events (A) and (C) indicates a probability of z percent (e.g., 90%) of interference. Embodiments are directed to any combination of facts and methods for computing the probability of interference.

In an embodiment, corrective actions are taken based on the probability of interference. In another embodiment, corrective actions are taken based on the events indicative of interference (e.g., a combination of one or more of events (A)-(C) as described above).

In an embodiment, a value of interference is computed based on a reported SNR and a minimum required SNR as referred to in event (A). In an embodiment, a noise floor of a network device is artificially increased to a higher value equal to a calibrated or measured noise floor plus an interference noise. In an embodiment, if the interference noise cannot be estimated or even if after artificially increasing the noise floor, interference is still detected, then varying values for the noise floor may be tested (for example, in increments of 1 dB steps) until the SNR discrepancy disappears or is within an acceptable range.

Embodiments are directed to one or more devices that include a hardware processor and that are configured to perform any of the operations described herein and/or recited in any of the claims below. Devices referred to herein include network devices and/or client devices. Devices referred to herein may include, for example, access points, controllers, radio frequency spectrum analyzers, or any devices with network devices configured for wireless communication.

In an embodiment, a non-transitory computer readable storage medium comprises instructions which, when executed by one or more processors, causes performance of any of the operations described herein.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue, including any subsequent correction.

What is claimed is:

1. A non-transitory computer readable medium comprising instructions which, when executed by at least one hardware processor, causes performance of operations comprising:
   determining a non-Wi-Fi signal on a radio frequency channel during a subset of a period of time during which non-Wi-Fi signals are being monitored;
   determining a particular noise floor value based at least in part on a signal strength associated with the non-Wi-Fi signal that was determined during the subset of the period of time during which non-Wi-Fi signals were being monitored;
   in response to a determination that interference impacts the signal strength, programming an artificially higher particular noise floor at a device;
   configuring the higher particular noise floor for the device, the device being configured to receive signals with a signal strength above the higher particular noise floor value;
   testing, based on a packet retry rate, the configured higher particular noise floor for the device to determine a device performance level measurement; and in response to the device performance level measurement below a particular threshold, incrementally increasing the higher particular noise floor until the particular threshold is met.

2. The non-transitory computer readable medium of claim 1 wherein the particular noise floor value is determined based on an amplitude of a Fast Fourier Transform (FFT) corresponding to the non-Wi-Fi signal.

3. The non-transitory computer readable medium of claim 1 wherein the particular noise floor value is determined based on a center frequency of a Fast Fourier Transform (FFT) corresponding to the non-Wi-Fi signal.

4. The non-transitory computer readable medium of claim 1 wherein the particular noise floor value is determined based on a duty cycle of a Fast Fourier Transform (FFT) corresponding to the non-Wi-Fi signal.

5. The non-transitory computer readable medium of claim 1 wherein the particular noise floor value is different than a noise floor value measured by a radio of the device.

6. The non-transitory computer readable medium of claim 1 wherein the non-Wi-Fi signal is generated by a frequency hopper.

7. The non-transitory computer readable medium of claim 1 wherein the non-Wi-Fi signal is generated by an on/off source.

8. The non-transitory computer readable medium of claim 1 wherein the particular noise floor value is determined based further in part on an error rate associated with data received by the device.

9. The non-transitory computer readable medium of claim 1 wherein the particular noise floor value is determined based further in part on a signal strength at which a threshold level of physical (PHY) layer errors are reported.

10. A non-transitory computer readable medium comprising instructions which, when executed by at least one hardware processor, causes performance of operations comprising:
configuring a first noise floor for a first device such that the first device decodes wireless signals with a signal strength above the first noise floor value;
determining that an error rate exceeds a threshold value, the error rate associated with data received by the first device configured with the first noise floor value;
in response to a determination that interference impacts the signal strength based on the error rate exceeding the threshold value, programming an artificially higher first noise floor value at a device;
testing the higher first noise floor value to determine a device performance level measurement; and
in response to the device performance level measurement below a particular threshold, incrementally increasing the higher first noise floor value until the particular threshold is met; and
in response to the incremental increase, selecting a second noise floor value based on the higher first noise floor value, different than the first noise floor value, for reconfiguring the first device.

11. The non-transitory computer readable medium of claim 10, wherein selecting the second noise floor value further comprises artificially programming the higher first noise floor value until the error rate associated with the data received by the first device does not exceed the threshold value.

12. The non-transitory computer readable medium of claim 10 wherein the error rate is a packet error rate.

13. The non-transitory computer readable medium of claim 10 wherein the error rate is a retry rate.

14. The non-transitory computer readable medium of claim 10 wherein the error rate is a physical layer error rate.

15. The non-transitory computer readable medium of claim 10 wherein a probability of interference is determined based on an occurrence or non-occurrence of at least one of (i) a difference between a measured signal to noise ratio (SNR) and a minimum SNR required to sustain a Modulation and Coding Scheme (MCS) of received frames is above a particular threshold, (ii) a difference between (1) a Frame Error Rate that should be sustained based on a SNR of received frames and (2) an actual Frame Error Rate that is greater than a particular threshold, or (iii) a difference between an actual noise floor and an expected noise floor is larger than a particular threshold.

16. A non-transitory computer readable medium comprising instructions which, when executed by at least one hardware processor, causes performance of operations comprising:
configuring a first noise floor for a first device such that the first device decodes wireless signals with a signal strength above the first noise floor value;
determining that actual information received with a radio of the first device does not match expected information;
in response to a determination that interference impacts the signal strength based on the determination that the actual information does not match the expected information, programming an artificially higher first noise floor value at a device;
testing the higher first noise floor value to determine a device performance level measurement; and
in response to the device performance level measurement below a particular threshold, incrementally increasing the higher first noise floor until the particular threshold is met; and
in response to the incremental increase, selecting a second noise floor value based on the higher first noise floor value, different than the first noise floor value, for reconfiguring the first device.

17. The non-transitory computer readable medium of claim 16 wherein the actual information comprises an actual Signal-to-Noise Ratio (SNR) for wireless signals detected by the radio of the first device and the expected information comprises an expected SNR for the wireless signals.

18. The non-transitory computer readable medium of claim 16 wherein the actual information comprises an actual signal strength for wireless signals detected by the radio of the first device and the expected information comprises an expected signal strength for the wireless signals.

19. The non-transitory computer readable medium of claim 16 wherein the actual information comprises an actual Modulation and Coding Scheme (MCS) for wireless signals detected by the radio of the first device and the expected information comprises an expected MCS for the wireless signals.

20. The non-transitory computer readable medium of claim 1, wherein configuring the higher particular noise floor comprises incrementally increasing the higher particular noise floor until a desired performance by the device is obtained.

* * * * *